United States Patent
Zhang

(10) Patent No.: US 11,188,443 B2
(45) Date of Patent: Nov. 30, 2021

(54) METHOD, APPARATUS AND SYSTEM FOR PROCESSING LOG DATA

(71) Applicant: BEIJING BAIDU NETCOM SCIENCE AND TECHNOLOGY CO., LTD., Beijing (CN)

(72) Inventor: Miao Zhang, Beijing (CN)

(73) Assignee: BEIJING BAIDU NETCOM SCIENCE AND TECHNOLOGY CO., LTD., Beijing (CN)

(*) Notice: Subject to any disclaimer, the term of this patent is extended or adjusted under 35 U.S.C. 154(b) by 86 days.

(21) Appl. No.: 16/505,284

(22) Filed: Jul. 8, 2019

(65) Prior Publication Data

US 2020/0042424 A1    Feb. 6, 2020

(30) Foreign Application Priority Data

Aug. 3, 2018  (CN) .......................... 201810877030.9

(51) Int. Cl.
G06F 15/173    (2006.01)
G06F 11/34     (2006.01)

(52) U.S. Cl.
CPC ...... G06F 11/3476 (2013.01); G06F 11/3438 (2013.01); G06F 11/3452 (2013.01)

(58) Field of Classification Search
CPC ............. G06F 11/3476; G06F 11/3438; G06F 11/3452
See application file for complete search history.

(56) References Cited

U.S. PATENT DOCUMENTS

| 2010/0010986 A1* | 1/2010 | Icho ................. G06F 16/44 707/E17.014 |
| 2014/0012901 A1* | 1/2014 | Ruhl ................ G06Q 10/06 709/203 |
| 2014/0149466 A1* | 5/2014 | Sato .................. G06F 11/3419 707/803 |

(Continued)

FOREIGN PATENT DOCUMENTS

| CN | 106528619 A | 3/2017 |
| CN | 106649627 A | 5/2017 |
| CN | 107451149 A | 12/2017 |

OTHER PUBLICATIONS

Office Action for CN201810877030.9, dated Jun. 10, 2021, 12 pages.

*Primary Examiner* — Christopher B Robinson
(74) *Attorney, Agent, or Firm* — Seed IP Law Group LLP

(57) ABSTRACT

Embodiments of the present disclosure disclose a method, apparatus and system for processing log data. A specific embodiment of the method includes: acquiring multiple pieces of to-be-processed log data generated based on a log within a preset time period, the to-be-processed log data including multiple attributes and preset indicators; determining multiple attribute value groups; determining, for an attribute value group, based on indicator values of preset indicators respectively indicated by multiple pieces of to-be-processed log data having each attribute value in the attribute value group, an indicator statistic value of the preset indicators of a log having each attribute value in the attribute value group; and generating a log data aggregation table based on indicator statistic values of preset indicators respectively corresponding to the multiple attribute value groups.

17 Claims, 8 Drawing Sheets

(56) References Cited

U.S. PATENT DOCUMENTS

| | | | | |
|---|---|---|---|---|
| 2014/0164379 A1* | 6/2014 | Jojgov | ................. | G06F 16/285 |
| | | | | 707/737 |
| 2015/0193522 A1* | 7/2015 | Choi | ..................... | G06F 16/285 |
| | | | | 707/737 |
| 2017/0039242 A1* | 2/2017 | Milton | ............... | G06Q 30/0269 |

* cited by examiner

METHOD, APPARATUS AND SYSTEM FOR PROCESSING LOG DATA

CROSS-REFERENCE TO RELATED APPLICATIONS

This application claims priority to Chinese Patent Application No. 201810877030.9, filed with the China National Intellectual Property Administration (CNIPA) on Aug. 3, 2018, the content of which is incorporated herein by reference in its entirety.

TECHNICAL FIELD

Embodiments of the present disclosure relate to the field of computer technology, specifically to the field of Internet technology, and more specifically to a method, apparatus and system for processing log data.

BACKGROUND

Web logs may include, but are not limited to, user access logs generated by various front-end web servers.

Each piece of user access log typically represents an access behavior of the user. A lot of useful information may be obtained from one piece of user access log, such as the accessor's IP, the time of the access, the target web page accessed, and the address of the source. Therefore, the user access log contains a large amount of information that people may be interest in, for example, we may acquire the page view of each page type on the website, and so on.

A commonly used log analysis method is generating a multi-dimensional data table by collecting and calculating user access logs within a certain period of time (e.g., 1 minute).

The existing method for the multi-dimensional data table is to send user access logs generated by all the information nodes that provide information service to a log aggregation server for aggregation calculation through a message queue.

SUMMARY

Embodiments of the present disclosure provide a method, apparatus and system for processing log data.

In a first aspect, the embodiments of the present disclosure provide a method for processing log data, including: acquiring a plurality of pieces of to-be-processed log data generated based on logs within a preset time period, the to-be-processed log data including a plurality of attributes and preset indicators; determining a plurality of attribute value groups, each attribute value group including at least two attribute values, and attribute values in each attribute value group corresponding to different attributes; for each attribute value group, determining, based on indicator values of preset indicators respectively indicated by a plurality of pieces of to-be-processed log data having attribute values in the attribute value group, indicator statistic values of the preset indicators of logs having the attribute values in the attribute value group; and generating a log data aggregation table based on indicator statistic values of preset indicators respectively corresponding to the plurality of attribute value groups.

In some embodiments, the to-be-processed log data is a log; and the acquiring a plurality of pieces of to-be-processed log data generated based on logs within a preset time period, includes: acquiring a plurality of logs generated locally within the preset time period; and the for each attribute value group, determining, based on indicator values of preset indicators respectively indicated by a plurality of pieces of to-be-processed log data having attribute values in the attribute value group, indicator statistic values of the preset indicators of logs having the attribute values in the attribute value group, includes: respectively accumulating indicator values of the preset indicators indicated by the logs having attribute values in the attribute value group, to obtain the indicator statistic values of the preset indicators of the logs having the attribute values in the attribute value group.

In some embodiments, each piece of the to-be-processed log data includes a preset first attribute value group, and an indicator value of a preset indicator; and the determining a plurality of attribute value groups, includes: determining the a plurality of e attribute value groups from preset first attribute value groups corresponding to the a plurality of pieces of to-be-processed log data; the for an attribute value group, determining, based on indicator values of preset indicators respectively indicated by a plurality of pieces of to-be-processed log data having attribute values in the attribute value group, indicator statistic values of the preset indicators of logs having attribute values in the attribute value group, includes: determining the plurality of pieces of to-be-processed log data having the attribute values in the attribute value group; and respectively accumulating the indicator values of the preset indicators indicated by the plurality of pieces of to-be-processed log data having the attribute values in the attribute value group, to obtain the indicator statistic values of the preset indicators of the logs having the attribute values in the attribute value group.

In some embodiments, the method further includes: determining a plurality of attribute subgroups from the plurality of attributes; for each attribute in each attribute subgroup, determining a plurality attribute values of the attribute from the log data aggregation table; determining, based on the plurality of attribute values of the attribute in the attribute subgroup, a plurality of attribute value subgroups of the attribute subgroup; for each attribute value subgroup of the attribute value subgroups, determining, according to the log data aggregation table, an indicator statistic value of a preset indicator corresponding to the attribute value subgroup; and generating, based on indicator statistic values of preset indicators respectively corresponding to the plurality of attribute value subgroups, a log data aggregation sub-table corresponding to the attribute subgroup.

In a second aspect, the embodiments of the present disclosure provide an apparatus for processing log data, including: an acquisition unit, configured to acquire a plurality of pieces of to-be-processed log data generated based on logs within a preset time period, the to-be-processed log data including a plurality of attributes and preset indicators; a first determining unit, configured to determine a plurality of attribute value groups, each attribute value group including at least two attribute values, and attribute values in each attribute value group corresponding to different attributes; a second determining unit, configured to determine, for each attribute value group, based on indicator values of preset indicators respectively indicated by a plurality of pieces of to-be-processed log data having attribute values in the attribute value group, indicator statistic values of the preset indicators of logs having the attribute values in the attribute value group; and a first generation unit, configured to generate a log data aggregation table based on indicator statistic values of preset indicators respectively corresponding to the plurality of attribute value groups.

In some embodiments, the to-be-processed log data is a log; and the acquisition unit is further configured to: acquire a plurality of logs generated locally within the preset time period; and the second determining unit is further configured to: for each attribute value group, respectively accumulate indicator values of the preset indicators indicated by the logs having attribute values in the attribute value group, to obtain the indicator statistic values of the preset indicators of the logs having the attribute values in the attribute value group; and the first generation unit is further configured to generate a log data aggregation table based on indicator statistic values of preset indicators respectively corresponding to the plurality of attribute value groups.

In some embodiments, each piece of the to-be-processed log data includes a preset first attribute value group, and an indicator value of a preset indicator; and the first determining unit is further configured to: determine a plurality of attribute value groups from preset first attribute value groups corresponding to the plurality of pieces of to-be-processed log data; and the second determining unit is further configured to: for each attribute value group, determine the plurality of pieces of to-be-processed log data having the attribute values in the attribute value group; and respectively accumulate the indicator values of the preset indicators indicated by the plurality of pieces of to-be-processed log data having the attribute values in the attribute value group, to obtain the indicator statistic values of the preset indicators of the logs having the attribute values in the attribute value group.

In some embodiments, the apparatus further includes a second generation unit, and the second generation unit is configured to: determine a plurality of attribute subgroups from the plurality of attributes; for each attribute in each attribute subgroup, determine a plurality of attribute values of the attribute from the log data aggregation table; determine, based on the plurality of attribute values of the attribute in the attribute subgroup, multiple attribute value subgroups of the attribute subgroup; for each attribute value subgroup of the attribute value subgroups, determine, according to the log data aggregation table, an indicator statistic value of a preset indicator corresponding to the attribute value subgroup; and generate, based on indicator statistic values of preset indicators respectively corresponding to the plurality of attribute value subgroups, a log data aggregation sub-table corresponding to the attribute subgroup.

In a third aspect, the embodiments of the present disclosure provide a system for processing log data, including an information service node, and the information service node is configured to: acquire a plurality of pieces of to-be-processed log data generated based on logs within a preset time period, the to-be-processed log data including a plurality of attributes and preset indicators, the plurality of to-be-processed log data are logs generated locally by the service node; determine a plurality of attribute value groups, each attribute value group including at least two attribute values, and attribute values in each attribute value group corresponding to different attributes; for each attribute value group, determine, based on indicator values of preset indicators respectively indicated by a plurality of pieces of to-be-processed log data having the attribute values in the attribute value group, indicator statistic values of the preset indicators of logs having the attribute values in the attribute value group; and generate a log data aggregation table based on indicator statistic values of preset indicators respectively corresponding to the plurality of attribute value groups, the log data aggregation table including the indicator statistic values of the preset indicators respectively corresponding to the plurality of attribute value groups.

In some embodiments, the system further includes a primary aggregation node, and the primary aggregation node is configured to: acquire the plurality of pieces of to-be-processed log data within the preset time period, the to-be-processed log data including a plurality of attributes and preset indicators, where the plurality of pieces of to-be-processed log data are stored in local log data aggregation tables obtained by processing a plurality of local logs by different information service nodes respectively; each piece of the to-be-processed log data includes a preset first attribute value group, and an indicator value of a preset indicator; determine the plurality of attribute value groups, where each attribute value group includes at least two attribute values, and attribute values in each attribute value group correspond to different attributes; where the determine the plurality of attribute value groups includes determining the plurality of attribute value groups from preset first attribute value groups corresponding to the multiple pieces of to-be-processed log data; for each attribute value group, determine, based on indicator values of preset indicators respectively indicated by a plurality of pieces of to-be-processed log data having the attribute values in the attribute value group, indicator statistic values of the preset indicators of logs having the attribute values in the attribute value group; and generate a log data aggregation table based on indicator statistic values of preset indicators respectively corresponding to the plurality of attribute value groups, the log data aggregation table including the indicator statistic values of the preset indicators respectively corresponding to the plurality of attribute value groups.

In some embodiments, the system further includes a secondary aggregation node, and the secondary aggregation node is configured to: acquire the plurality of pieces of to-be-processed log data within the preset time period, the to-be-processed log data including a plurality of attributes and preset indicators, where the to-be-processed log data are stored in a primary log data aggregation table obtained through a statistics performed by a primary aggregation node on local log data aggregation tables acquired from a plurality of information service nodes; each piece of the to-be-processed log data includes a preset first attribute value group and the indicator value of the preset indicator; determine the plurality of attribute value groups, where each attribute value group includes at least two attribute values, and attribute values in each attribute value group correspond to different attributes; the determine the plurality of attribute value groups includes determining the plurality of attribute value groups from preset first attribute value groups corresponding to the plurality of pieces of to-be-processed log data; for each attribute value group, determine, based on indicator values of preset indicators respectively indicated by the plurality of pieces of to-be-processed log data having the attribute values in the attribute value group, the indicator statistic values of the preset indicators of the logs having the attribute values in the attribute value group; and generate the log data aggregation table based on the indicator statistic values of preset indicators respectively corresponding to the plurality of attribute value groups, the log data aggregation table including the indicator statistic values of the preset indicators respectively corresponding to the plurality attribute value groups.

In some embodiments, the secondary aggregation node is further configured to: determine a plurality of attribute subgroups from the plurality of attributes; for each attribute in each attribute subgroup, determine a plurality of attribute values of the attribute from the log data aggregation table; determine, based on the plurality of attribute values of the attribute in the attribute subgroup, a plurality of attribute value subgroups of the attribute subgroup; for each attribute value subgroup of the attribute value subgroups, determine, according to the log data aggregation table, an indicator statistic value of a preset indicator corresponding to the attribute value subgroup; and generate, based on indicator statistic values of preset indicators respectively corresponding to the plurality of attribute value subgroups, a log data aggregation sub-table corresponding to the attribute subgroup.

In a fourth aspect, the embodiments of the present disclosure provide an electronic device, including: one or more processors; and a storage apparatus, storing one or more programs thereon, the one or more programs, when executed by the one or more processors, cause the one or more processors to implement the method according to any one of the embodiments in the first aspect.

In a fifth aspect, the embodiments of the present disclosure provide a computer readable medium, storing a computer program thereon, the program, when executed by a processor, implements the method according to any one of the embodiments in the first aspect.

The method, apparatus and system for processing log data provided by the embodiments of the present disclosure, acquire a plurality of pieces of to-be-processed log data generated based on logs within a preset time period, the to-be-processed log data including multiple attributes and preset indicators; determine multiple attribute value groups, each attribute value group including at least two attribute values, and attribute values in each attribute value group corresponding to different attributes; determine, for an attribute value group, based on indicator values of preset indicators respectively indicated by multiple pieces of to-be-processed log data having each attribute value in the attribute value group, an indicator statistic value of the preset indicators of a log having each attribute value in the attribute value group; and generate a log data aggregation table based on indicator statistic values of preset indicators respectively corresponding to the multiple attribute value groups. When a local log data aggregation table is transmitted to further perform statistical analysis on the log within the preset time period, the occupied bandwidth resources may be reduced, which is conducive to improve data transmission efficiency.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It may be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
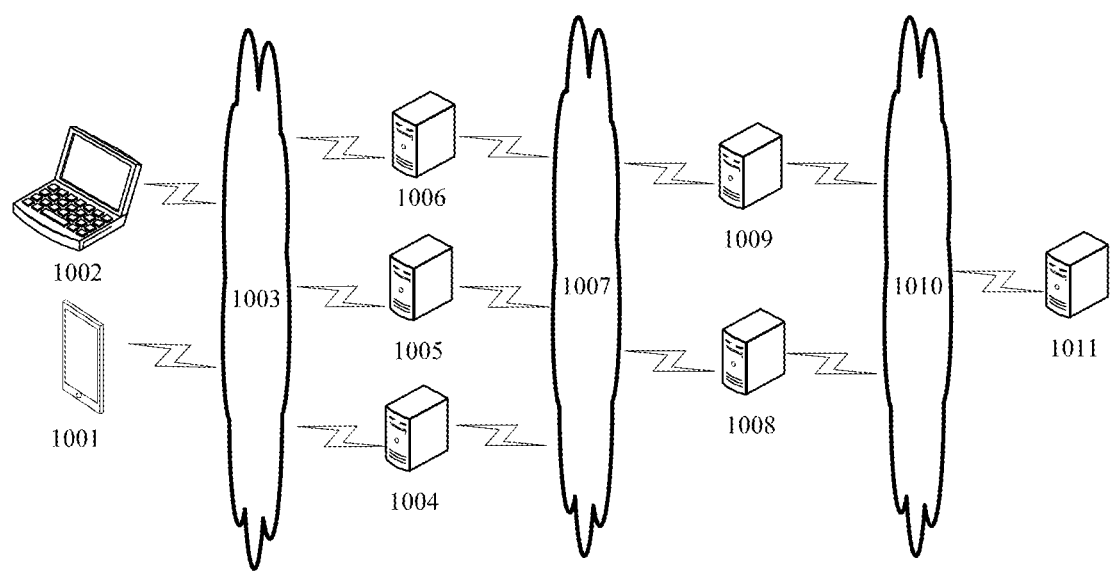
FIG. 1 is an exemplary system architecture diagram to which a method for processing log data of an embodiment of the present disclosure may be applied.

FIG. 1 illustrates an exemplary system architecture 100 to which an embodiment of a method for processing log data of the present disclosure may be applied.

As shown in FIG. 1, the system architecture 100 may include terminal devices 1001, 1002, information service nodes 1004, 1005, 1006, primary aggregation nodes 1008, 1009, a secondary aggregation node 1011, and networks 1003, 1007, and 1010. The network 1003 is used to provide a communication link medium between the terminal devices 101, 102, 103 and the information service nodes 1004, 1005, 1006. The network 1007 is used to provide a communication link medium between the information service nodes 1004, 1005, 1006 and the primary aggregation nodes 1008, 1009. The network 1010 is used to provide a communication link medium between the primary aggregation nodes 1008, 1009 and the secondary aggregation node 1011. The networks 1003, 1007, 1010 may include a variety of connections, such as wired, wireless communication links, or optic fibers.

A user may interact with the information service nodes 1004, 1005, 1006 through the network 1003 using the terminal devices 1001, 1002 to receive or send messages and the like. Various client applications, such as web browser applications, shopping applications, search applications, instant messaging tools, mailbox clients, or social platform software, may be installed on the terminal devices 1001 and 1002.

The information service nodes 1004, 1005, 1006 may provide various services, such as receiving access requests of the terminal devices 1001, 1002, and returning information corresponding to the access requests to the terminal devices. The information service nodes 1004, 1005, 1006 may generate user access logs based on the user's access through the terminal devices 1001 and 1002, aggregate local user access logs generated within a preset time period, and send aggregated generated data through the network 1007 to the primary aggregation nodes 1008, 1009.

The primary aggregation nodes 1008, 1009 may provide various services, such as receiving data sent by the information service nodes 1004, 1005, 1006 and respectively aggregated by the information service nodes 1004, 1005, 1006 from the user access logs thereon, and then aggregate the data to generate primary aggregation data, and send the primary aggregation data to the secondary aggregation node 1011 through the network 1010.

The secondary aggregation node 1011 may provide various services, such as receiving the primary aggregation data sent by the primary aggregation nodes 1008, 1009, and analyze and process the primary aggregation data to obtain a log data aggregation table within the preset time period.

It should be noted that the method for processing log data provided by the embodiments of the present disclosure may be performed by the information service nodes 1004, 1005, and 1006, or may be performed by the primary aggregation nodes 1008 and 1009, and may also be performed by the secondary aggregation node 1011, which is not limited in the present disclosure.

It should be noted that the information service nodes may be hardware or software. When the information service node is hardware, it may be implemented as a distributed information service node cluster composed of multiple information service nodes, or may be implemented as a single information service node. When the information service node is software, it may be implemented as a plurality of software or software modules (for example, software or software modules for providing distributed services), or as a single software or software module, which is not specifically limited in the present disclosure.

It should be noted that the primary aggregation node may be hardware or software. When the primary aggregation node is hardware, it may be implemented as a distributed primary aggregation node cluster composed of a plurality of primary aggregation nodes, or may be implemented as a single primary aggregation node. When the primary aggregation node is software, it may be implemented as a plurality of software or software modules (for example, software or software modules for providing distributed services), or as a single software or software module, which is not specifically limited in the present disclosure.

It should be noted that the secondary aggregation node may be hardware or software. When the secondary aggregation node is hardware, it may be implemented as a distributed secondary aggregation node cluster composed of a plurality of secondary aggregation nodes, or may be implemented as a single secondary aggregation node. When the secondary aggregation node is software, it may be implemented as a plurality of software or software modules (for example, software or software modules for providing distributed services), or as a single software or software module, which is not specifically limited in the present disclosure.

It should be noted that the numbers of the terminal device, the network, the information service node, the primary aggregation node, and the secondary aggregation node in FIG. 1 are merely illustrative. Any number of terminal device, network, information service node, primary aggregation node, and secondary aggregation node may be provided based on the implementation requirements.

Figure 2:
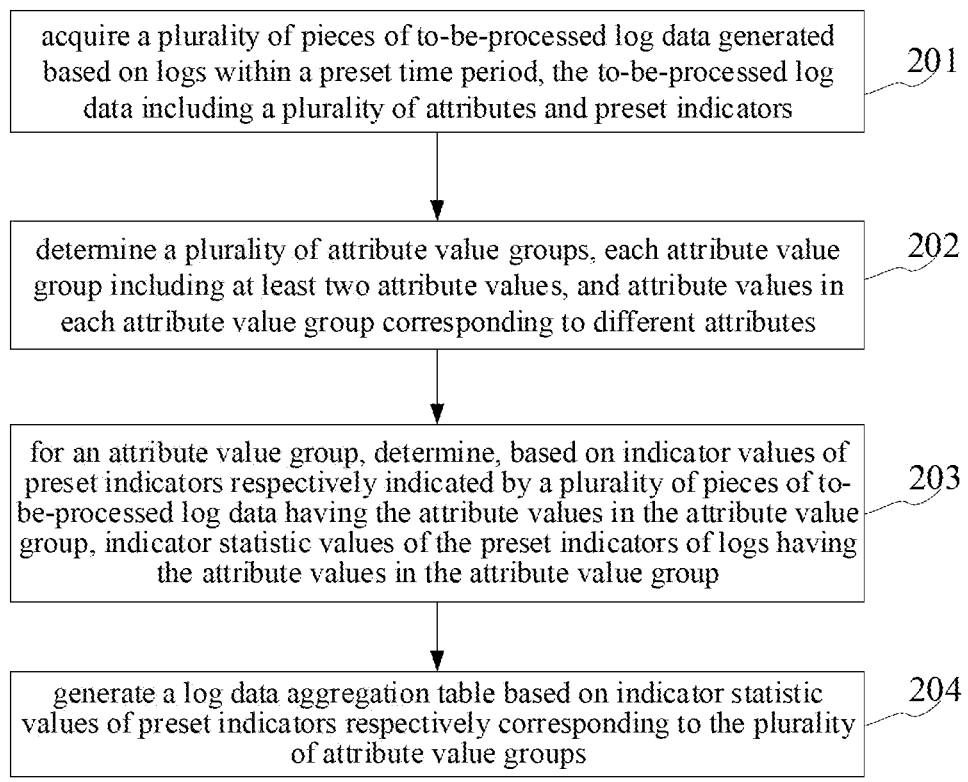
FIG. 2 is a flowchart of an embodiment of the method for processing log data according to the present disclosure.

With further reference to FIG. 2, a flow 200 of an embodiment of a method for processing log data according to the present disclosure is illustrated. The method for processing log data includes the following steps:

Step 201, acquiring a plurality of pieces of to-be-processed log data generated based on logs within a preset time period, a to-be-processed log data including a plurality of attributes and preset indicators.

In operation, a network device, a system, or a service program generates an event record called a log. Each of the log records a description of a related operation such as the date, time, user, and action.

The log in the present disclosure may be various logs, such as application logs, security logs, system logs, or user access logs. The user access log is taken as an example for explanation as follows.

In the present embodiment, an executing body of the method for processing log data may acquire a plurality of pieces of to-be-processed log data generated based on user access logs by using various methods.

In the present embodiment, the executing body may be the information service node, the primary aggregation node, or the second aggregation node as shown in FIG. 1.

Typically, when a user accesses a network to acquire information, a user access log is generated in a server (such as the information service node shown in FIG. 1) that provides information to the user. The user access log may include information such as the user source, the service type corresponding to the log, and the information service response result. The user source, the service type corresponding to the log, the information service response result, and the like may be used as attributes of the user access log. In this way, the user access log may include a plurality of attributes.

In addition, the user access log may further include a preset indicator. Here, the preset indicator may be, for example, the number of user access logs, the delay corresponding to the user access log, and the like.

In some alternative implementations of the present embodiment, the above mentioned plurality of pieces of to-be-processed log data are logs. That is, the plurality of pieces of to-be-processed log data may be the logs generated by the information service node within the preset time period. The logs may be user access logs.

In these alternative implementations, the executing body of the method for processing log data may be, for example, the information service node shown in FIG. 1. The executing body may locally acquire a plurality of user access logs generated by users' accessing locally provided data service via different clients within the preset time period. It may be understood that the number of the users here may be more than one.

In some application scenarios, the plurality of user access logs may be stored in a preset database. The executing body may extract the plurality of user access logs which are within the preset time period in the preset database.

In some application scenarios, the plurality of user access logs may be stored in a user access log file. The executing body may extract user access logs which are within the preset time period one by one from the file, thereby extracting a plurality of user access logs.

Step 202, determining a plurality of attribute value groups, each attribute value group including at least two attribute values, and respective attribute values in each attribute value group corresponding to different attributes.

In the present embodiment, based on the plurality of pieces of to-be-processed log data obtained in step 201, the executing body (such as the information service node shown in FIG. 1) may first acquire attribute values corresponding to the respective attributes in each user access log; and then determine a plurality of attribute value groups from the attribute values corresponding to the respective attributes in each user access log via various analysis approaches. Each attribute value group may include at least two attribute values, and the attribute values in each attribute value group correspond to different attributes.

The attribute value here may be a specific value of an attribute. For example, a mobile communication provider A may be a value of the user source attribute of a user access log.

In the present embodiment, the number of attribute values included in the attribute value groups may be equal.

The attributes corresponding to each attribute value in the attribute value group may be selected from the attribute values corresponding to the plurality of attributes of the user access log in advance.

Step 203, for each attribute value group, determining, based on indicator values of preset indicators respectively indicated by a plurality of pieces of to-be-processed log data having attribute values in the attribute value group, indicator statistic values of the preset indicators of logs having the attribute values in the attribute value group.

In the present embodiment, for each attribute value group, the executing body of the method for processing log data may first determine a plurality of pieces of to-be-processed log data having the attribute values in the attribute value group. Then, the indicator values of the preset indicators indicated by each piece of the to-be-processed log data are determined.

In the present embodiment, each piece of the to-be-processed log data is the user access log. If a preset indicator is the number of user access logs, the number of user access logs indicated by each piece of the to-be-processed log data is 1. The number of user access logs having the attribute values in the attribute value group may be determined according to the number of user access logs indicated by each piece of the to-be-processed log data.

Specifically, for each attribute value group, the executing body may perform statistics on the number of user access logs having the attribute values in the attribute value group, thereby determining the number of user access logs having the attribute values in the attribute value group.

In the above method, the numbers of user access logs respectively corresponding to the respective attribute value groups may be obtained.

If a preset indicator is the delay corresponding to the user access log, specific delay values (for example, 10 microseconds, 20 microseconds) indicated by the user log having the attribute values in the attribute value group may be accumulated to obtain an indicator statistic value of the preset indicator of the user log having the attribute values in the attribute value group.

Step 204, generating a log data aggregation table based on indicator statistic values of preset indicators respectively corresponding to the plurality of attribute value groups.

In the present embodiment, the executing body may generate a log data aggregation table based on the indicator statistic value of the preset indicator corresponding to each attribute value group.

In the log data aggregation table, a plurality of attribute value groups and the indicator statistic values of the preset indicators corresponding to each attribute value group may be included.

Figure 3:
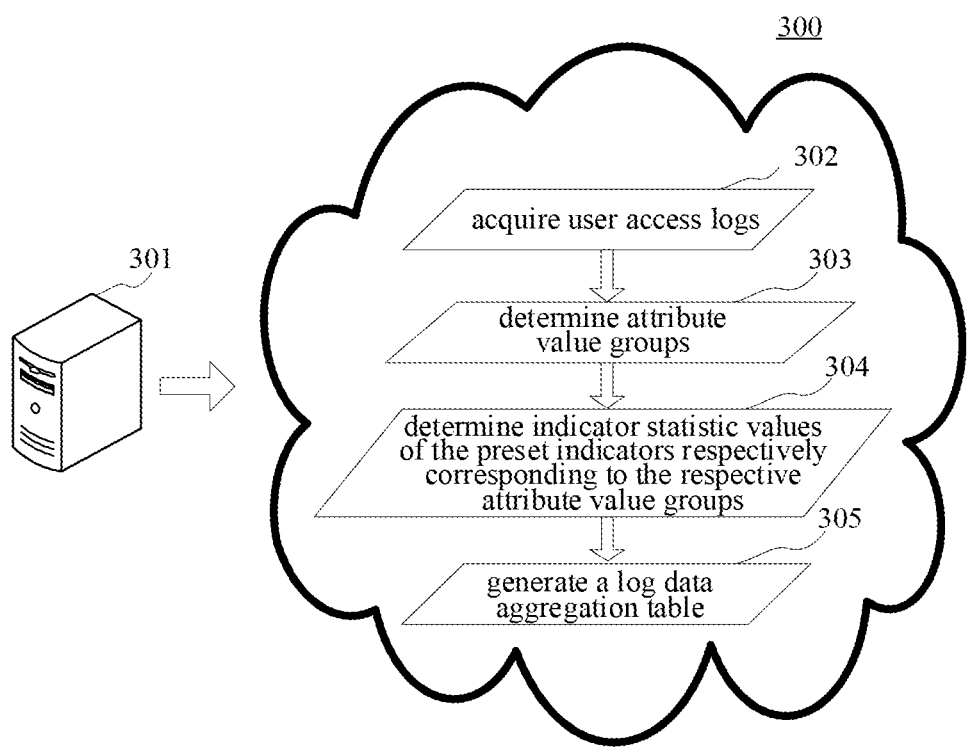
FIG. 3 is a schematic diagram of an application scenario of the method for processing log data according to the present disclosure.

With further reference to FIG. 3, FIG. 3 is a schematic diagram 300 of an application scenario of the method for processing log data according to the present embodiment. In the application scenario of FIG. 3, an information service node 301 may first locally acquire a plurality of user access logs 302 generated by user' accessing locally provided data services via different clients within a preset time period, where each user access log may include a plurality of attributes as well as preset indicators. The information service node 301 may determine a plurality of attribute value groups 303 from attribute values corresponding to the plurality of attributes in each user access log. Each attribute value group includes at least two attribute values, and the respective attribute values in the given attribute value group correspond to different attributes. Then, for each attribute value group, the information service node 301 may determine, based on indicator values of preset indicators respectively indicated by a plurality of pieces of to-be-processed log data having the attribute values in the attribute value group, indicator statistic values 304 of the preset indicators having the attribute values in the attribute value group. Finally, the information service node 301 generates a log data aggregation table 305 based on indicator statistic values of preset indicators respectively corresponding to the plurality of attribute value groups.

The method provided by the above embodiment of the present disclosure generates a local log data aggregation table by aggregating a plurality of local logs which are generated within a preset time period based on a plurality of attribute value groups. When the local log data aggregation table is transmitted for further statistical analysis on the logs which are generated within the preset time period, the bandwidth resources occupied by the data transmission may be reduced, which is conducive to improve data transmission efficiency.

Figure 4:
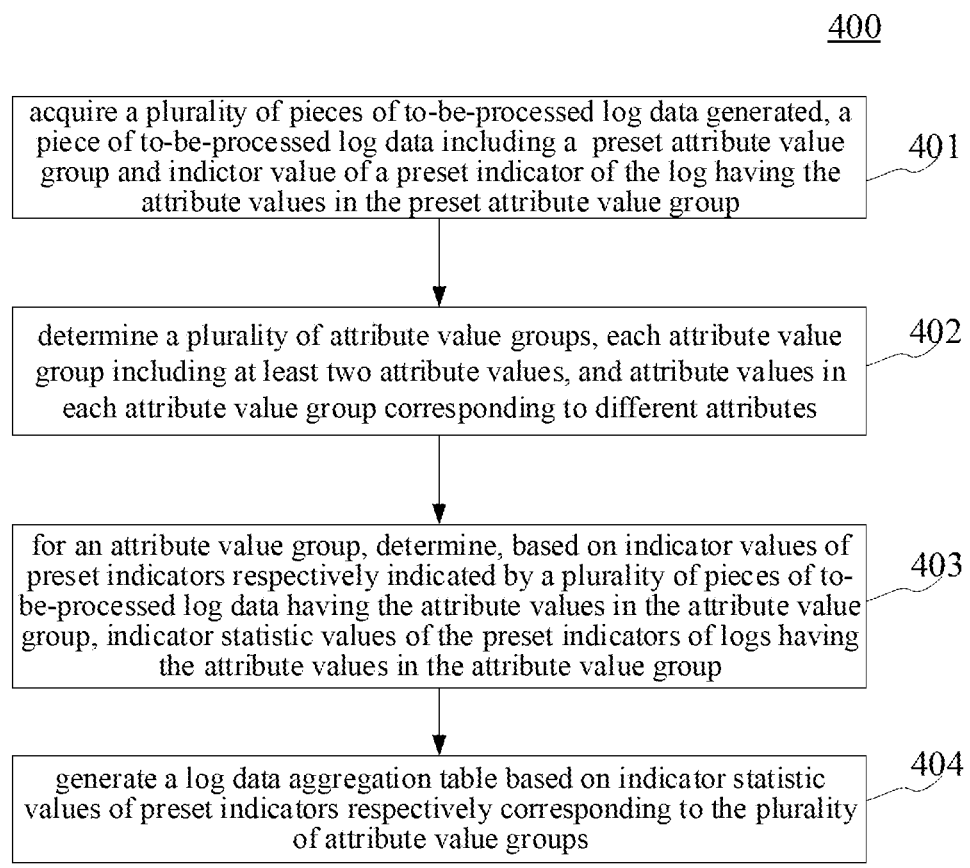
FIG. 4 is a flowchart of another embodiment of the method for processing log data according to the present disclosure.

With further reference to FIG. 4, a flow 400 of another embodiment of the method for processing log data is illustrated. The flow 400 of the method for processing log data includes the following steps:

Step 401, acquiring a plurality of pieces of to-be-processed log data generated based on logs within a preset time period, the to-be-processed log data including a plurality of attributes and preset indicators.

In the present embodiment, the executing body may acquire a plurality of pieces of to-be-processed log data generated based on a user access logs within a preset time period by using various methods.

In the present embodiment, the executing body may be the primary aggregation node, or the second aggregation node as shown in FIG. 1.

In the present embodiment, each piece of the to-be-processed log data may include a preset first attribute value group, and indicator values of a preset indicator of user access logs having the respective attribute values in the preset first attribute value group.

Each attribute value in the first preset attribute value group may correspond to an attribute. The attribute may be, for example, the user source, the service type corresponding to the log, and the like. The attribute value may be, for example, a specific value of the above attribute. The attribute value of the attribute "user source" may be, for example, a mobile communication provider A, a mobile communication provider B, or the like.

In some alternative implementations of the present embodiment, the to-be-processed log data may be stored in the log data aggregation table generated by the information service node according to the steps of the embodiment shown in FIG. 2. In the present embodiment, the log data aggregation table generated by the information service node may be regarded as a local log data aggregation table of the information service node.

In these alternative implementations, the executing body of the method for processing log data (for example, the primary aggregation node shown in FIG. 1) may acquire a plurality of pieces of to-be-processed log data from the respective local log data aggregation tables of the plurality of information service nodes through a wired connection or a wireless connection.

That is, the plurality of pieces of to-be-processed log data may be stored in the local log data aggregation tables generated by different information service nodes according to the steps of the embodiment shown in FIG. 2, respectively.

In these alternative implementations, the first preset attribute value group of each piece of to-be-processed log data may be the attribute value group in the local log data aggregation table of the piece of to-be-processed log data corresponding to the piece of to-be-processed log data.

Step 402, determining a plurality of attribute value groups, each attribute value group including at least two attribute values, and the respective attribute values in each attribute value group corresponding to different attributes.

In the present embodiment, the executing body may determine a plurality of attribute value groups from preset first attribute value groups respectively corresponding to the plurality of pieces of to-be-processed log data.

For example, a plurality of preset first attribute value groups corresponding attribute values thereof are not identical are extracted from the preset first attribute value groups corresponding to the plurality of pieces of to-be-processed log data. The extracted plurality of preset first attribute value groups are determined as the plurality of attribute value groups required by the present embodiment. Each attribute value group may include at least two attribute values, and the respective attribute values in each attribute value group may correspond to different attributes.

Step 403, for each attribute value group, based on indicator values of the preset indicators respectively indicated by a plurality of pieces of to-be-processed log data having the attribute values in the attribute value group, indicator statistic values of the preset indicators of logs having the attribute values in the attribute value group.

In the present embodiment, the to-be-processed log data is obtained from the local log data aggregation table of the information service node, and the indicator values of the preset indicators of the user access log indicated by each piece of the to-be-processed log data are obtained by analyzing the local user access log by the information service node. The indicator values of the preset indicators of the user access log indicated by each piece of the to-be-processed log data may be any positive integer.

In the present embodiment, for each attribute value group, the executing body may determine, in the plurality of pieces of to-be-processed log data, a plurality of pieces of to-be-processed log data having the attribute values in the attribute value group. Then, the number of the indicator values of the preset indicators respectively indicated by the plurality of pieces of to-be-processed log data having the attribute values in the attribute value group is respectively accumulated, to obtain the indicator statistic values of the preset indicators corresponding to the attribute value group.

That is, for each attribute value group, the executing body may respectively accumulate the indicator values of the preset indicators respectively indicated by the plurality of pieces of to-be-processed log data having the attribute values in the attribute value group, to obtain the indicator statistic values of the preset indicators of the logs having the attribute values in the attribute value group.

Step 404, generating a log data aggregation table based on indicator statistic values of preset indicators respectively corresponding to the plurality of attribute value groups.

In the present embodiment, the above step 404 is the same as step 204 shown in FIG. 2, and detailed description thereof will be omitted.

As can be seen from FIG. 4, the flow 400 of the method for processing log data in the present embodiment highlights that the acquired plurality of pieces of to-be-processed log data includes preset first attribute value groups and the indicator values of the preset indicators, as compared with the embodiment corresponding to FIG. 2. Further, the plurality of pieces of to-be-processed log data may be stored in the local log data aggregation table of the information service node. Therefore, the solution described in the present embodiment may reduce the calculation amount of the executing body during generating the log data aggregation table. Therefore, it is possible to solve the problem of single device performance bottleneck caused by excessive calculation during generating a log data aggregation table by acquiring and aggregating logs from different information service nodes. In addition, the network resources occupied by the information service node to transmit data to the primary aggregation node may also be reduced.

Figure 5:
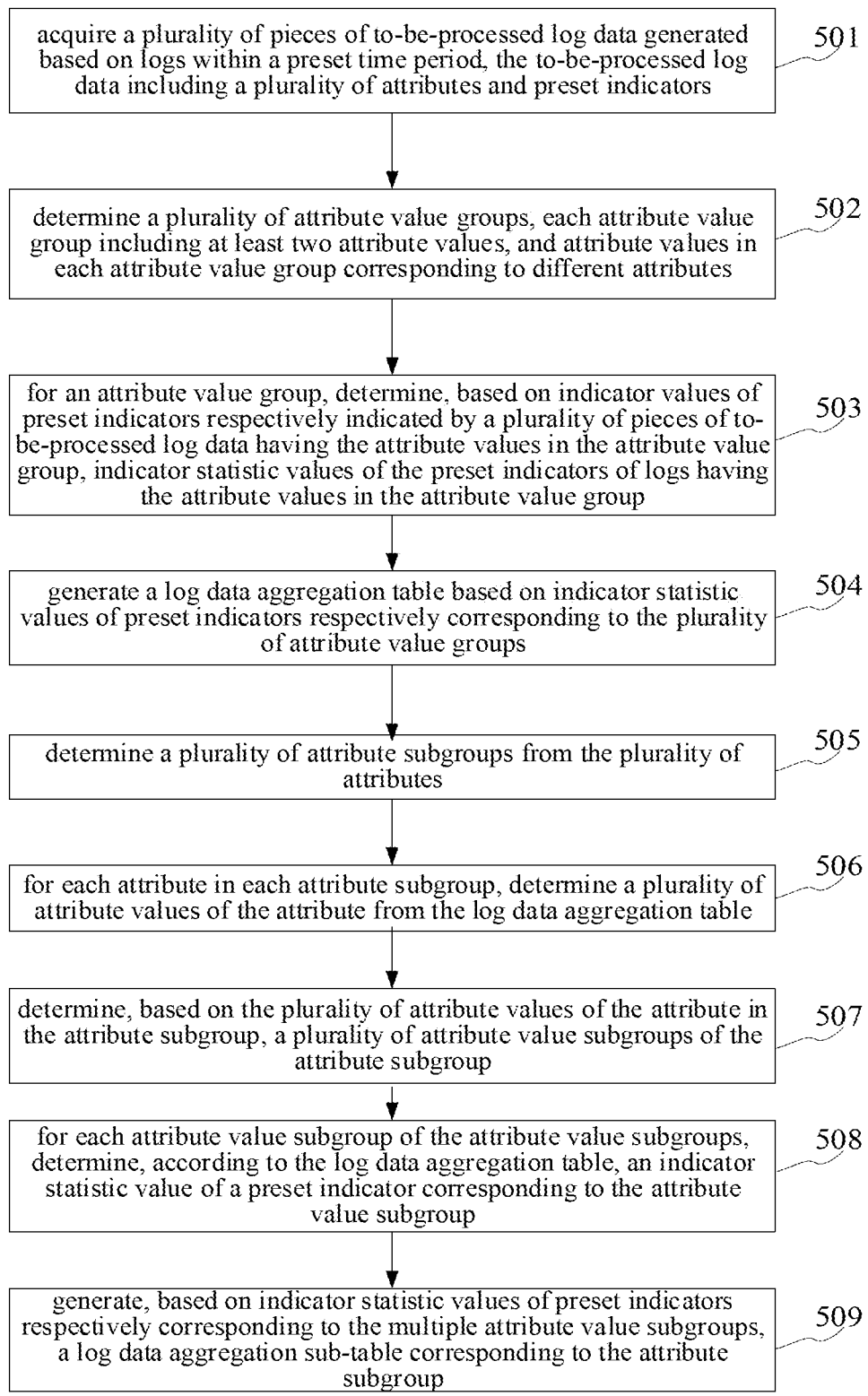
FIG. 5 is a flowchart of another embodiment of the method for processing log data according to the present disclosure.

With further reference to FIG. 5, a flow 500 of another embodiment of the method for processing log data is illustrated. The flow 500 of the method for processing log data includes the following steps:

Step 501, acquiring a plurality of pieces of to-be-processed log data generated based on logs within a preset time period, the to-be-processed log data including a plurality of attributes and preset indicators.

In the present embodiment, the executing body may acquire a plurality of pieces of to-be-processed log data generated based on user access logs within a preset time period by using various methods. The to-be-processed log data may include a plurality of attributes and preset indicators.

In the present embodiment, the executing body may be the second aggregation node as shown in FIG. 1.

The to-be-processed log data may include a preset first attribute value group. Here, the preset first attribute value group may include a plurality of attribute values. Each attribute value may correspond to one attribute. The attribute here may be, for example, the service type corresponding to the log, the user source, the information service response result, and the like. The attribute value of one attribute may be the value of the attribute. For example, for the attribute "user source", the value of the attribute may be a mobile communication provider A, a mobile communication provider B, a mobile communication provider C, and the like. The service type corresponding to a log here refers to the type corresponding to the information acquired by the user by accessing the information service node. For example, the attribute "the service type corresponding to the log" of the log generated when the user acquires news information from the information service node may take the value of news.

In some alternative implementations of the present embodiment, the to-be-processed log data may be stored in the log data aggregation table obtained by the primary aggregation node according to the steps of the embodiment shown in FIG. 4. Here, the log data aggregation table generated by the primary aggregation node may be regarded as a primary log data aggregation table.

In some alternative implementations of the present embodiment, the executing body (for example, the secondary aggregation node shown in FIG. 1) may acquire the plurality of pieces of to-be-processed log data from the plurality of primary aggregation nodes. For example, the executing body may acquire, from each primary aggregation node, respective pieces of data in the primary log data aggregation table generated by the primary aggregation node as the to-be-processed log data.

In these alternative implementations, the first preset attribute value group of each piece of to-be-processed log data may be an attribute value group which is corresponding to the piece of to-be-processed log data and is in the primary log data aggregation table the piece of to-be-processed log data located thereof.

Step 502, determining a plurality of attribute value groups, each attribute value group including at least two attribute values, and the respective attribute values in each attribute value group corresponding to different attributes.

In the present embodiment, the above step 502 is the same as step 402 shown in FIG. 4, and detailed description thereof will be omitted.

Step 503, for each attribute value group, determining, based on indicator values of preset indicators respectively indicated by a plurality of pieces of to-be-processed log data having the attribute values in the attribute value group, indicator statistic values of the preset indicators of logs having the attribute values in the attribute value group.

In the present embodiment, the to-be-processed log data may be obtained from the primary log data aggregation table generated by the primary aggregation node. The indicator values of the preset indicators indicated by each piece of the to-be-processed log data may be positive integers greater than or equal to 1.

For each attribute value group, the executing body may first determine a plurality of pieces of to-be-processed log data having the attribute values in the attribute value group. Then, indicator values of preset indicators respectively indicated by the plurality of pieces of to-be-processed log data having the attribute values in the attribute value group are respectively accumulated, to obtain indicator statistic values of the preset indicators of the user access logs having the attribute values in the attribute value group.

Step 504, generating a log data aggregation table based on indicator statistic values of preset indicators respectively corresponding to the plurality of attribute value groups.

In the present embodiment, the above step 504 is the same as step 204 shown in FIG. 2 and step 404 shown in FIG. 4, and detailed description thereof will be omitted.

In the present embodiment, since the executing body acquires the plurality of pieces of to-be-processed log data from the primary log data aggregation table generated by the primary aggregation node, the calculation performed by the executing body is less.

In the present embodiment, the information service node may acquire a plurality of logs thereon within a preset time period, and generate a local log data aggregation table of the information service node according to the steps in the embodiment shown in FIG. 2. Then the primary aggregation node acquires a plurality of pieces of to-be-processed log data within the preset time period from local log data aggregation tables of a plurality of information service nodes, and then generates the primary log data aggregation table according to the embodiment shown in FIG. 4. The secondary aggregation node may acquire the plurality of pieces of to-be-processed log data within the preset time period from the respective primary log data aggregation tables of the primary aggregation nodes, and then generate a final log data aggregation table according to the steps 502-504 shown in FIG. 5. In the above process of generating the final log data aggregation table, the aggregation calculation of the plurality of logs is distributed in the information service nodes, the primary aggregation nodes, and the secondary aggregation node. Therefore, in the process of generating the final log data aggregation table, there is no performance bottleneck caused by excessive calculation of a single device. In addition, in the process of data transmission involved in the generation of the log data aggregation table, the amount of data transmitted is less, so that network congestion caused by excessive network resource usage does not occur.

Step 505, determining a plurality of attribute subgroups from the plurality of attributes.

In the present embodiment, the executing body may split the plurality of attributes of the to-be-processed log data, thereby obtain a plurality of attribute subgroups. The number of attributes included in the attribute subgroups may be less than the number of attribute values in the attribute value groups of the to-be-processed log data.

For example, the to-be-processed log data corresponds to three attributes: the user source, the service type corresponding to the log, and the information service response result. The executing body may split the above three attributes into three attribute subgroups including two attributes and three attribute subgroups including one attribute. The attribute subgroups including two attributes are: the service type corresponding to the log, the user source; the service type corresponding to the log, the information service response result; the user source, and the information service response result. The attribute subgroups including one attribute may be: the service type corresponding to the log; the user source; the information service response result.

Step 506, determining, for each attribute in each attribute subgroup, a plurality of attribute values of the attribute from the log data aggregation table.

In the present embodiment, for each attribute in each attribute subgroup, the executing body may determine a plurality of attribute values of the attribute from the log data aggregation table obtained in step 504.

Taking the attribute "user source" as an example, if in the log data aggregation table: the attribute value of a plurality of pieces of log data corresponding to the attribute is a mobile communication provider A; the attribute value of a plurality of pieces of log data corresponding to the attribute is a mobile communication provider B; the attribute value of a plurality of pieces of log data corresponding to the attribute is a mobile communication providers C, etc., the executing body may use the mobile communication provider A, the mobile communication provider B, the mobile communication provider C, and the like as the plurality of attribute values of the attribute "user source" determined from the log data aggregation table.

In this way, an attribute in an attribute subgroup corresponds to a plurality of attribute values.

Step 507, determining, based on the plurality of attribute values of the each attribute in the attribute subgroup, a plurality of attribute value subgroups of the attribute subgroup.

For each attribute subgroup, the executing body may determine, based on the plurality of attribute values of the attribute in the attribute subgroup, a plurality of attribute value subgroups of the attribute subgroup.

Specifically, when the number of attributes in the attribute subgroup is greater than 1, a plurality of attribute values corresponding to the respective attributes in the attribute subgroup may be combined, to determine the plurality of attribute value subgroups of the attribute subgroup. For example, an attribute subgroup A includes the attributes "service type corresponding to the log" and "user source". The attribute values of the attribute "service type corresponding to the log" include AA and BB; and the attribute values of the attribute "user source" include: CC, DD, and EE. The executing body combines the above AA, BB and CC, DD, and EE to obtain a plurality of attribute value subgroups of the attribute subgroup A: AA, CC; AA, DD; AA, EE; BB, CC; BB, DD; BB, EE.

Step 508, for each attribute value subgroup of the attribute value subgroups, determining, according to the log data aggregation table, an indicator statistic value of a preset indicator corresponding to the attribute value subgroup.

The executing body may respectively accumulate the indicator values of the preset indicators respectively indicated by the plurality of piece of log data having the attribute value or attribute values in the attribute value subgroup in the log data aggregation table generated in the above step 504, to obtain indicator statistic values of the preset indicators having the attribute value or attribute values in the attribute value subgroup.

Step 509, generating, based on indicator statistic values of preset indicators respectively corresponding to the plurality of attribute value subgroups, a log data aggregation sub-table corresponding to the attribute subgroup.

For this attribute subgroup, a log data aggregation sub-table corresponding to the attribute subgroup may be generated based on indicator statistic values of preset indicators respectively corresponding to the plurality of attribute value subgroups corresponding to the attribute subgroup. The log data aggregation sub-table may include the plurality of attribute value subgroups corresponding to this attribute subgroup, and the indicator statistic values of the preset indicators corresponding to the respective attribute value subgroups.

As can be seen from FIG. 5, as compared with the embodiment corresponding to FIG. 4, the flow 500 of the method for processing log data in the present embodiment highlights the step of acquiring a plurality of pieces of to-be-processed log data from the primary log data aggregation table generated in the embodiments shown in FIG. 4 and generating a final log data aggregation table. Therefore, the solution described in the present embodiment may further reduce the calculation amount of a single device during generating the log data aggregation table, and may further improve the efficiency of generating the log data aggregation table. In addition, the flow 500 further highlights the step that the plurality of attributes are divided into multiple attribute subgroups, and the indicator statistic values of the preset indicators respectively corresponding to the multiple attribute value subgroups corresponding to each attribute subgroup are determined to generate a log data aggregation sub-table corresponding to the attribute subgroup. Therefore, the log analysis data provided by the present embodiment is more comprehensive.

Figure 6:
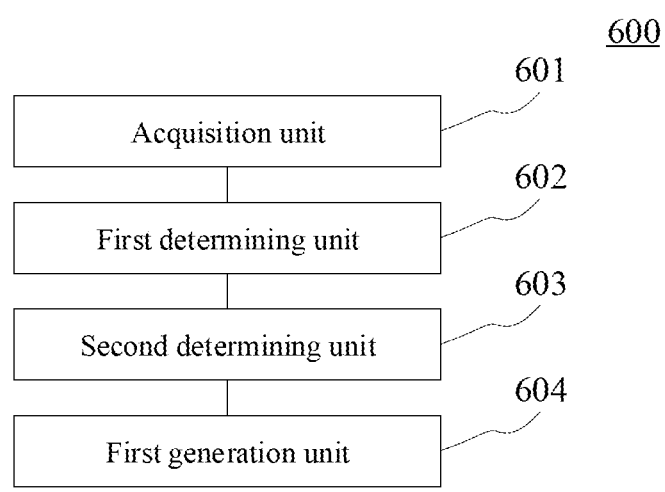
FIG. 6 is a schematic structural diagram of an embodiment of an apparatus for processing log data according to the present disclosure.

With further reference to FIG. 6, as an implementation of the method shown in the above figures, the present disclosure provides an embodiment of an apparatus for processing log data, and the apparatus embodiment corresponds to the method embodiment as shown in FIG. 2, and the apparatus may be specifically applied to various electronic devices.

As shown in FIG. 6, the apparatus 600 for processing log data of the present embodiment includes: an acquisition unit 601, a first determining unit 602, a second determining unit 603 and a first generation unit 604. The acquisition unit 601 is configured to acquire a plurality of pieces of to-be-processed log data generated based on logs within a preset time period, the to-be-processed log data including a plurality of attributes and preset indicators. The first determining unit 602 is configured to determine a plurality of attribute value groups, each attribute value group including at least two attribute values, and attribute values in each attribute value group corresponding to different attributes. The second determining unit 603 is configured to determine, for each attribute value group, based on indicator values of preset indicators respectively indicated by a plurality of pieces of to-be-processed log data having attribute values in the attribute value group, indicator statistic values of the preset indicators of logs having the attribute values in the attribute value group. The first generation unit 604 is configured to generate a log data aggregation table based on indicator statistic values of preset indicators respectively corresponding to the plurality of attribute value groups.

In the present embodiment, the specific processing and the technical effects thereof of the acquisition unit 601, the first determining unit 602, the second determining unit 603 and the first generation unit 604 of the apparatus 600 for processing log data may be respectively referred to in the related descriptions of step 201, step 202, step 203 and step 204 in the corresponding embodiment of FIG. 2, and detailed description thereof will be omitted.

In some alternative implementations of the present embodiment, the to-be-processed log data is the log; and the acquisition unit 601 is further configured to: acquire a plurality of logs generated locally within the preset time period; and the second determining unit 603 is further configured to: for each attribute value group, respectively accumulate indicator values of the preset indicators indicated by the logs having attribute values in the attribute value group, to obtain the indicator statistic values of the preset indicators of the logs having the attribute values in the attribute value group.

In some alternative implementations of the present embodiment, each piece of the to-be-processed log data includes a preset first attribute value group, and an indicator value of a preset indicator; and the first determining unit 602 is further configured to: determine a plurality of attribute value groups from preset first attribute value groups corresponding to the plurality of pieces of to-be-processed log data; and the second determining unit 603 is further configured to: for each attribute value group, determine the plurality of pieces of to-be-processed log data having the attribute values in the attribute value group; and respectively accumulate the indicator values of the preset indicators indicated by the plurality of pieces of to-be-processed log data having the attribute values in the attribute value group, to obtain the indicator statistic values of the preset indicators of the logs having the attribute values in the attribute value group.

In some alternative implementations of the present embodiment, the apparatus further includes a second generation unit (not shown in the figure), and the second generation unit is configured to: determine a plurality of attribute subgroups from the plurality of attributes; for each attribute in each attribute subgroup, determine a plurality of attribute values of the attribute from the log data aggregation table; determine, based on the plurality of attribute values of the attribute in the attribute subgroup, a plurality of attribute value subgroups of the attribute subgroup; for each attribute value subgroup of the attribute value subgroups, determine, according to the log data aggregation table, an indicator statistic value of a preset indicator corresponding to the attribute value subgroup; and generate, based on indicator statistic values of preset indicators respectively corresponding to the plurality of attribute value subgroups, a log data aggregation sub-table corresponding to the attribute subgroup.

Figure 7:
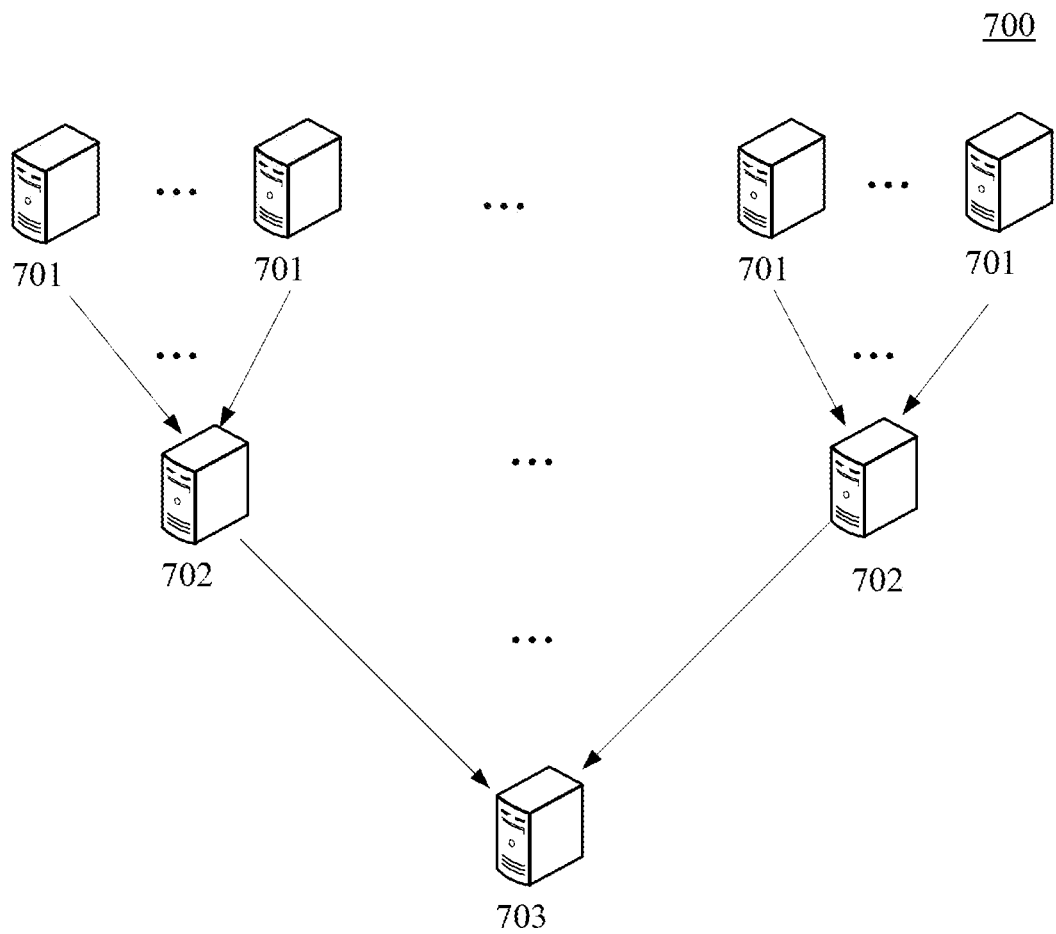
FIG. 7 is a schematic diagram of an embodiment of a system for processing log data according to the present disclosure.

With reference to FIG. 7, FIG. 7 is a schematic diagram of an embodiment of a system for processing log data according to the present disclosure.

As shown in FIG. 7, the system 700 for processing log data includes multiple information service nodes 701. Each information service node 701 is configured to: acquire a plurality of pieces of to-be-processed log data within a preset time period, the to-be-processed log data including a plurality of attributes and preset indicators, the to-be-processed log data is a log generated locally by the information service node; determine a plurality of attribute value groups, each attribute value group including at least two attribute values, and attribute values in each attribute value group corresponding to different attributes; for each attribute value group, determine based on indicator values of preset indicators respectively indicated by a plurality of pieces of to-be-processed log data having attribute values in the attribute value group, indicator statistic values of the preset indicators of logs having the attribute values in the attribute value group; and generate a log data aggregation table based on indicator statistic values of preset indicators respectively corresponding to the plurality of attribute value groups, the log data aggregation table including the indicator statistic values of the preset indicators respectively corresponding to the plurality of attribute value groups.

For a detailed description of the process and the technical effects thereof of generating the log data aggregation table by the information service node 701, reference may be made to the description of the embodiment shown in FIG. 2, and detailed description thereof will be omitted.

In some alternative implementations of the present embodiment, the system 700 for processing log data further includes multiple primary aggregation nodes 702, and the primary aggregation node 702 is configured to: acquire the plurality pieces of to-be-processed log data within the preset time period, the to-be-processed log data including a plurality of attributes and preset indicators, where the plurality of pieces of to-be-processed log data are stored in a local log data aggregation table obtained by processing a plurality of local logs by different information service nodes respectively; each piece of the to-be-processed log data includes a preset first attribute value group and an indicator value of a preset indicator; determine the plurality of attribute value groups, where each attribute value group includes at least two attribute values, and attribute values in each attribute value group correspond to different attributes; where the determine the plurality of attribute value groups includes determining the plurality of attribute value groups from preset first attribute value groups corresponding to the plurality of pieces of to-be-processed log data; for each attribute value group, determine, based on indicator values of preset indicators respectively indicated by a plurality of pieces of to-be-processed log data having attribute values in the attribute value group, indicator statistic values of the preset indicators of logs having the attribute values in the attribute value group; and generate a log data aggregation table based on indicator statistic values of preset indicators respectively corresponding to the plurality of attribute value groups, the log data aggregation table including the indicator statistic values of the preset indicators respectively corresponding to the plurality of attribute value groups.

For a detailed description of the process and the technical effects thereof of generating the log data aggregation table by the primary aggregation node 702, reference may be made to the description of the embodiment shown in FIG. 4, and detailed description thereof will be omitted.

In some alternative implementations of the present embodiment, the system 700 for processing log data further includes a secondary aggregation node 703, and the secondary aggregation node 703 is configured to: acquire the plurality of pieces of to-be-processed log data within the preset time period, the to-be-processed log data including a plurality of attributes and preset indicators, where the to-be-processed log data are stored in a primary log data aggregation table obtained through a statistics performed by a primary aggregation node on local log data aggregation tables acquired from a plurality of information service nodes; each piece of the to-be-processed log data includes a preset first attribute value group and an indicator value of a preset indicator; determine the plurality of attribute value groups, where each attribute value group includes at least two attribute values, and attribute values in each attribute value group correspond to different attributes; the determine the plurality of attribute value groups includes determining the multiple attribute value groups from preset first attribute value groups corresponding to the plurality of pieces of to-be-processed log data; for each attribute value group, determine, based on indicator values of preset indicators respectively indicated by the plurality of pieces of to-be-processed log data having the attribute values in the attribute value group, the indicator statistic values of the preset indicators of the logs having the attribute values in the attribute value group; and generate the log data aggregation table based on the indicator statistic values of preset indicators respectively corresponding to the plurality of attribute value groups, the log data aggregation table including the indicator statistic values of the preset indicators respectively corresponding to the plurality of attribute value groups.

For a detailed description of the process of generating the log data aggregation table by the secondary aggregation node 703, reference may be made to the description of the embodiment shown in FIG. 5, and detailed description thereof will be omitted.

In these alternative implementations, the information service node 701 may acquire a plurality of logs thereon within the preset time period, and generate a local log data aggregation table of the information service node 701 by analyzing and processing the plurality of logs. The primary aggregation node 701 then acquires a plurality of pieces of to-be-processed log data within the preset time period from the local log data aggregation tables of a plurality of information service nodes 701, and generates the primary log data aggregation table by analyzing and processing the plurality of to-be-processed log data. The secondary aggregation node 703 may acquire the plurality of pieces of to-be-processed log data within the preset time period from the primary log data aggregation tables of the primary aggregation nodes 702, and then generate a final log data aggregation table by analyzing and processing the plurality of to-be-processed log data. In the process of generating the final log data aggregation table, the aggregation calculation of the plurality of logs is distributed in the information service nodes 701, the primary aggregation nodes 702, and the secondary aggregation node 703. Therefore, in the process of generating the final log data aggregation table, there is no performance bottleneck caused by excessive calculation of a single device. In addition, in the process of data transmission involved in the generation of the log data aggregation table, the amount of data transmitted is less, so that network congestion caused by excessive network resource usage does not occur.

In some alternative implementations of the present embodiment, the secondary aggregation node 703 is further configured to: determine a plurality of attribute subgroups from the a plurality of attributes; for each attribute in each attribute subgroup, determine a plurality of attribute values of the attribute from the log data aggregation table; determine, based on the plurality of attribute values of the attribute in the attribute subgroup, a plurality of attribute value subgroups of the attribute subgroup; for each attribute value subgroup of the attribute value subgroups, determine, according to the log data aggregation table, an indicator statistic value of a preset indicator corresponding to the attribute value subgroup; and generate, based on indicator statistic values of preset indicators respectively corresponding to the plurality of attribute value subgroups, a log data aggregation sub-table corresponding to the attribute subgroup.

Figure 8:
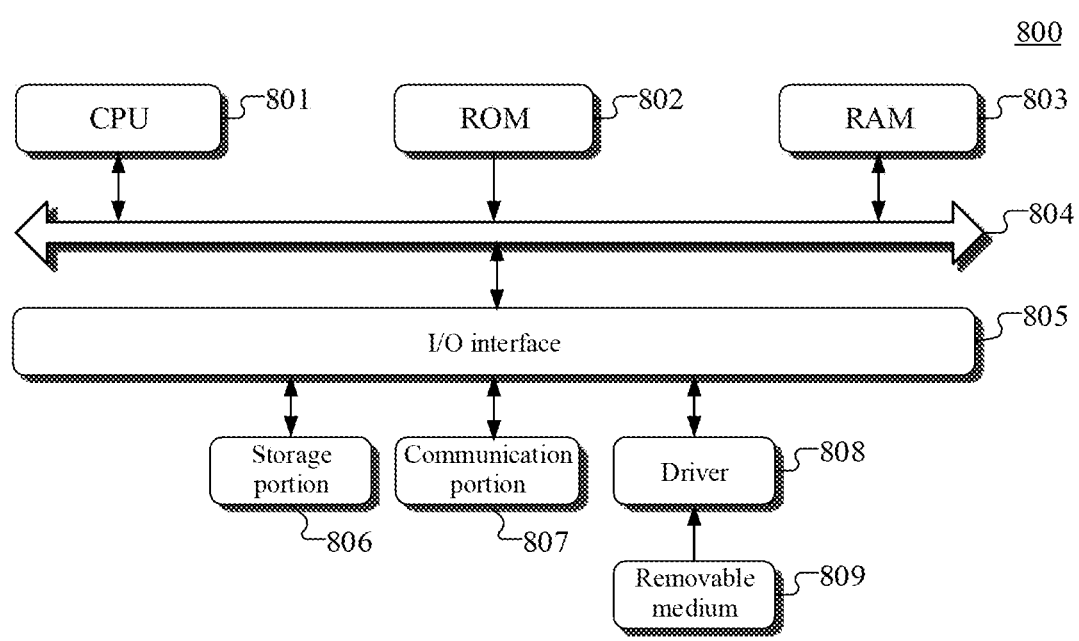
FIG. 8 is a schematic structural diagram of a computer system adapted to implement an electronic device of the embodiments of the present disclosure.

With further reference to FIG. 8, a schematic structural diagram of a computer system 800 adapted to implement an electronic device of the embodiments of the present disclosure is shown. The electronic device shown in FIG. 8 is merely an example, and should not impose any limitation on the function and scope of use of the embodiments of the present disclosure.

As shown in FIG. 8, the computer system 800 includes a central processing unit (CPU) 801, which may execute various appropriate actions and processes in accordance with a program stored in a read-only memory (ROM) 802 or a program loaded into a random access memory (RAM) 803 from a storage portion 806. The RAM 803 also stores various programs and data required by operations of the system 800. The CPU 801, the ROM 802 and the RAM 803 are connected to each other through a bus 804. An input/output (I/O) interface 805 is also connected to the bus 804.

The following components are connected to the I/O interface 805: a storage portion 806 including a hard disk and the like; and a communication portion 807 including a network interface card, such as a LAN card and a modem. The communication portion 807 performs communication processes via a network, such as the Internet. A driver 808 is also connected to the I/O interface 805 as required. A removable medium 809, such as a magnetic disk, an optical disk, a magneto-optical disk, and a semiconductor memory, may be installed on the driver 808, to facilitate the retrieval of a computer program from the removable medium 809, and the installation thereof on the storage portion 806 as needed.

In particular, according to the embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for performing the method as illustrated in the flow chart. In such an embodiment, the computer program may be downloaded and installed from a network via the communication portion 807, and/or may be installed from the removable medium 809. The computer program, when executed by the central processing unit (CPU) 801, implements the above mentioned functionalities as defined by the method of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory or any suitable combination of the above. In the present disclosure, the computer readable storage medium may be any physical medium containing or storing programs which may be used by a command execution system, apparatus or element or incorporated thereto. In the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

A computer program code for performing operations in the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the accompanying drawings. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system performing specified functions or operations, or by a combination of a dedicated hardware and computer instructions.

The units involved in the embodiments of the present disclosure may be implemented by means of software or hardware. The described units may also be provided in a processor, for example, may be described as: a processor including an acquisition unit, a first determining unit, a second determining unit and a first generation unit. Here, the names of these units do not in some cases constitute limitations to such units themselves. For example, the acquisition unit may also be described as "a unit for acquiring multiple pieces of to-be-processed log data generated based on a log within a preset time period".

In another aspect, the present disclosure further provides a computer readable medium. The computer readable medium may be included in the apparatus in the above described embodiments, or a stand-alone computer readable medium not assembled into the apparatus. The computer readable medium stores one or more programs. The one or more programs, when executed by the apparatus, cause the apparatus to: acquire a plurality of pieces of to-be-processed log data generated based on logs within a preset time period, the to-be-processed log data including a plurality of attributes and preset indicators; determine a plurality of attribute value groups, each attribute value group including at least two attribute values, and attribute values in each attribute value group corresponding to different attributes; for each attribute value group, determine, based on indicator values of preset indicators respectively indicated by a plurality of pieces of to-be-processed log data having attribute values in the attribute value group, indicator statistic values of the preset indicators of logs having the attribute values in the attribute value group; and generate a log data aggregation table based on indicator statistic values of preset indicators respectively corresponding to the plurality of attribute value groups.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure. Technical schemes formed by the above-described features being interchanged with, but not limited to, technical features with similar functions disclosed in the present disclosure are examples.

What is claimed is:

1. A method for processing log data, performed by a primary aggregation node, the method comprising:

acquiring a plurality of pieces of to-be-processed log data generated based on logs generated by accessing data services provided by a server via different clients within a preset time period, the to-be-processed log data comprising a plurality of attributes and preset indicators, wherein the plurality of attributes comprise a user source attribute, and an attribute value of the user source attribute comprises a mobile communication provider providing a communication between a client and the server, wherein the plurality of pieces of to-be-processed log data are stored in a plurality of local log data aggregation tables obtained by processing a plurality of local logs by different information service nodes respectively; each piece of the to-be-processed log data comprises a preset first attribute value group and an indicator value of a preset indicator;

determining a plurality of attribute value groups, each attribute value group comprising at least two attribute values, and attribute values in each attribute value group corresponding to different attributes; wherein the determining the plurality of attribute value groups comprises determining the plurality of attribute value groups from preset first attribute value groups corresponding to the plurality of pieces of to-be-processed log data;

for each attribute value group, determining, based on indicator values of preset indicators respectively indicated by a plurality of pieces of to-be-processed log data having attribute values in the attribute value group, indicator statistic values of the preset indicators of logs having the attribute values in the attribute value group; and generating a log data aggregation table based on indicator statistic values of preset indicators respectively corresponding to the plurality of attribute value groups, the generated log data aggregation table comprising the indicator statistic values of the preset indicators respectively corresponding to the plurality of attribute value groups.

2. The method according to claim 1, wherein the to-be-processed log data is a log; and the acquiring a plurality of pieces of to-be-processed log data generated based on logs generated by accessing data services provided by a server via different clients within a preset time period comprises:

acquiring a plurality of logs generated locally within the preset time period; and the for each attribute value group, determining, based on indicator values of preset indicators respectively indicated by a plurality of pieces of to-be-processed log data having attribute values in the attribute value group, indicator statistic values of the preset indicators of logs having the attribute values in the attribute value group, comprises:

respectively accumulating indicator values of the preset indicators indicated by the logs having attribute values in the attribute value group, to obtain the indicator statistic values of the preset indicators of the logs having the attribute values in the attribute value group.

3. The method according to claim 1, wherein the for each attribute value group, determining, based on indicator values of preset indicators respectively indicated by a plurality of pieces of to-be-processed log data having attribute values in the attribute value group, indicator statistic values of the preset indicators of logs having attribute values in the attribute value group, comprises:

determining the plurality of pieces of to-be-processed log data having the attribute values in the attribute value group; and respectively accumulating the indicator values of the preset indicators indicated by the plurality of pieces of to-be-processed log data having the attribute values in the attribute value group, to obtain the indicator statistic values of the preset indicators of the logs having the attribute values in the attribute value group.

4. The method according to claim 1, the method further comprising:

determining a plurality of attribute subgroups from the plurality of attributes;

for each attribute in each attribute subgroup, determining a plurality of attribute values of the attribute from the log data aggregation table; determining, based on the plurality of attribute values of the attribute in the attribute subgroup, a plurality of attribute value subgroups of the attribute subgroup;

for each attribute value subgroup of the attribute value subgroups, determining, according to the log data aggregation table, an indicator statistic value of a preset indicator corresponding to the attribute value subgroup; and generating, based on indicator statistic values of preset indicators respectively corresponding to the plurality of attribute value subgroups, a log data aggregation sub-table corresponding to the attribute subgroup.

5. An apparatus for processing log data, the apparatus comprising:

at least one processor; and a memory storing instructions, the instructions when executed by the at least one processor, cause the at least one processor to perform operations, the operations comprising:

acquiring a plurality of pieces of to-be-processed log data generated based on logs generated by accessing data services provided by a server via different clients within a preset time period, the to-be-processed log data comprising a plurality of attributes and preset indicators, wherein the plurality of attributes comprise a user source attribute, and an attribute value of the user source attribute comprises a mobile communication provider providing a communication between a client and the server, wherein the plurality of pieces of to-be-processed log data are stored in a plurality of local log data aggregation tables obtained by processing a plurality of local logs by different information service nodes respectively; each piece of the to-be-processed log data comprises a preset first attribute value group and an indicator value of a preset indicator;

determining a plurality of attribute value groups, each attribute value group comprising at least two attribute values, and attribute values in each attribute value group corresponding to different attributes; wherein the determining the plurality of attribute value groups comprises determining the plurality of attribute value groups from preset first attribute value groups corresponding to the plurality of pieces of to-be-processed log data;

for each attribute value group, determining, based on indicator values of preset indicators respectively indicated by a plurality of pieces of to-be-processed log data having attribute values in the attribute value group, indicator statistic values of the preset indicators of logs having the attribute values in the attribute value group; and generating a log data aggregation table based on indicator statistic values of preset indicators respectively corresponding to the plurality of attribute value groups, the generated log data aggregation table comprising the indicator statistic values of the preset indicators respectively corresponding to the plurality of attribute value groups.

6. The apparatus according to claim 5, wherein the to-be-processed log data is a log; and the acquiring a plurality of pieces of to-be-processed log data generated based on logs generated by accessing data services provided by a server via different clients within a preset time period comprises:

acquiring a plurality of logs generated locally within the preset time period; and the for each attribute value group, determining, based on indicator values of preset indicators respectively indicated by a plurality of pieces of to-be-processed log data having attribute values in the attribute value group, indicator statistic values of the preset indicators of logs having the attribute values in the attribute value group, comprises:

for each attribute value group, respectively accumulating indicator values of the preset indicators indicated by the logs having attribute values in the attribute value group, to obtain the indicator statistic values of the preset indicators of the logs having the attribute value in the attribute value group.

7. The apparatus according to claim 5, wherein the for each attribute value group, determining, based on indicator values of preset indicators respectively indicated by a plurality of pieces of to-be-processed log data having attribute values in the attribute value group, indicator statistic values of the preset indicators of logs having attribute values in the attribute value group, comprises:

for each attribute value group, determining the plurality of pieces of to-be-processed log data having the attribute values in the attribute value group; and respectively accumulating the indicator values of the preset indicators indicated by the plurality of pieces of to-be-processed log data having the attribute values in the attribute value group, to obtain the indicator statistic values of the preset indicators of the logs having the attribute values in the attribute value group.

8. The apparatus according to claim 5, wherein the operations further comprise:

determining a plurality of attribute subgroups from the plurality of attributes;

for each attribute in each attribute subgroup, determining a plurality of attribute values of the attribute from the log data aggregation table;

determining, based on the plurality of attribute values of the attribute in the attribute subgroup, a plurality of attribute value subgroups of the attribute subgroup;

for each attribute value subgroup of the attribute value subgroups, determining, according to the log data aggregation table, an indicator statistic value of a preset indicator corresponding to the attribute value subgroup; and generating, based on indicator statistic values of preset indicators respectively corresponding to the plurality of attribute value subgroups, a log data aggregation sub-table corresponding to the attribute subgroup.

9. A system for processing log data, the system comprising an information service node, and the information service node being configured to:

acquire a plurality of pieces of to-be-processed log data generated based on logs generated by accessing data services provided by a server via different clients within a preset time period, the to-be-processed log data comprising a plurality of attributes and preset indicators, wherein the plurality of attributes comprise a user source attribute, and an attribute value of the user source attribute comprises a mobile communication provider providing a communication between a client and the server, the plurality of to-be-processed log data are logs generated locally by the service node;

determine a plurality of attribute value groups, each attribute value group comprising at least two attribute values, and attribute values in each attribute value group corresponding to different attributes;

for each attribute value group, determine, based on indicator values of preset indicators respectively indicated by a plurality of pieces of to-be-processed log data having attribute values in the attribute value group, indicator statistic values of the preset indicators of logs having the attribute values in the attribute value group; and generate a log data aggregation table based on indicator statistic values of preset indicators respectively corresponding to the plurality of attribute value groups, the log data aggregation table comprising the indicator statistic values of the preset indicators respectively corresponding to the plurality of attribute value groups, wherein the system further comprises a primary aggregation node, and the primary aggregation node is configured to:

acquire the plurality of pieces of to-be-processed log data within the preset time period, the to-be-processed log data comprising a plurality of attributes and preset indicators, wherein the plurality of pieces of to-be-processed log data are stored in local log data aggregation tables obtained by processing a plurality of local logs by different information service nodes respectively; each piece of the to-be-processed log data comprises a preset first attribute value group and an indicator value of a preset indicator;

determine the plurality of attribute value groups, wherein each attribute value group comprises at least two attribute values, and attribute values in each attribute value group correspond to different attributes; wherein the determine the plurality of attribute value groups comprises determining the plurality of attribute value groups from preset first attribute value groups corresponding to the plurality of pieces of to-be-processed log data;

for each attribute value group, determine, based on indicator values of preset indicators respectively indicated by a plurality of pieces of to-be-processed log data having the attribute values in the attribute value group, indicator statistic values of the preset indicators of logs having the attribute values in the attribute value group; and generate a log data aggregation table based on indicator statistic values of preset indicators respectively corresponding to the plurality of attribute value groups, the log data aggregation table comprising the indicator statistic values of the preset indicators respectively corresponding to the plurality of attribute value groups.

10. The system according to claim 9, wherein the system further comprises a secondary aggregation node, and the secondary aggregation node is configured to:

acquire the plurality of pieces of to-be-processed log data within the preset time period, the to-be-processed log data comprising a plurality of attributes and preset indicators, wherein the to-be-processed log data are stored in a primary log data aggregation table obtained through a statistics performed by a primary aggregation node on local log data aggregation tables acquired from a plurality of information service nodes; each piece of the to-be-processed log data comprises the preset first attribute value group and the indicator value of the preset indicator;

determine the plurality of attribute value groups, wherein each attribute value group comprises at least two attribute values, and attribute values in each attribute value group correspond to different attributes;

the determine the plurality of attribute value groups comprises determine the plurality of attribute value groups from preset first attribute value groups corresponding to the plurality of pieces of to-be-processed log data;

for each attribute value group, determine, based on indicator values of preset indicators respectively indicated by the plurality of pieces of to-be-processed log data having the attribute values in the attribute value group, the indicator statistic values of the preset indicators of the logs having the attribute values in the attribute value group; and generate the log data aggregation table based on the indicator statistic values of preset indicators respectively corresponding to the plurality of attribute value groups, the log data aggregation table comprising the indicator statistic values of the preset indicators respectively corresponding to the plurality of attribute value groups.

11. The system according to claim 10, wherein the secondary aggregation node is further configured to:

determine a plurality of attribute subgroups from the plurality of attributes;

for each attribute in each attribute subgroup, determine a plurality of attribute values of the attribute from the log data aggregation table;

determine, based on the plurality of attribute values of the attribute in the attribute subgroup, a plurality of attribute value subgroups of the attribute subgroup;

for each attribute value subgroup of the attribute value subgroups, determine, according to the log data aggregation table, an indicator statistic value of a preset indicator corresponding to the attribute value subgroup; and generate, based on indicator statistic values of preset indicators respectively corresponding to the plurality of attribute value subgroups, a log data aggregation subtable corresponding to the attribute subgroup.

12. A non-transitory computer readable medium, storing a computer program thereon, the program, when executed by a processor, implements operations comprising:

acquiring a plurality of pieces of to-be-processed log data generated based on logs generated by accessing data services provided by a server via different clients within a preset time period, the to-be-processed log data comprising a plurality of attributes and preset indicators, wherein the plurality of attributes comprise a user source attribute, and an attribute value of the user source attribute comprises a mobile communication provider providing a communication between a client and the server, wherein the plurality of pieces of to-be-processed log data are stored in a plurality of local log data aggregation tables obtained by processing a plurality of local logs by different information service nodes respectively; each piece of the to-be-processed log data comprises a preset first attribute value group and an indicator value of a preset indicator;

determining a plurality of attribute value groups, each attribute value group comprising at least two attribute values, and attribute values in each attribute value group corresponding to different attributes; wherein the determining the plurality of attribute value groups comprises determining the plurality of attribute value groups from preset first attribute value groups corresponding to the plurality of pieces of to-be-processed log data;

for each attribute value group, determining, based on indicator values of preset indicators respectively indicated by a plurality of pieces of to-be-processed log data having attribute values in the attribute value group, indicator statistic values of the preset indicators of logs having the attribute values in the attribute value group; and generating a log data aggregation table based on indicator statistic values of preset indicators respectively corresponding to the plurality of attribute value groups-, the generated log data aggregation table comprising the indicator statistic values of the preset indicators respectively corresponding to the plurality of attribute value groups.

13. The medium according to claim 12, wherein the to-be-processed log data is a log; and the acquiring a plurality of pieces of to-be-processed log data generated based on logs generated by accessing data services provided by a server via different clients within a preset time period comprises:

acquiring a plurality of logs generated locally within the preset time period; and the for each attribute value group, determining, based on indicator values of preset indicators respectively indicated by a plurality of pieces of to-be-processed log data having attribute values in the attribute value group, indicator statistic values of the preset indicators of logs having the attribute values in the attribute value group, comprises:

respectively accumulating indicator values of the preset indicators indicated by the logs having attribute values in the attribute value group, to obtain the indicator statistic values of the preset indicators of the logs having the attribute values in the attribute value group.

14. The medium according to claim 12, wherein the for each attribute value group, determining, based on indicator values of preset indicators respectively indicated by a plurality of pieces of to-be-processed log data having attribute values in the attribute value group, indicator statistic values of the preset indicators of logs having attribute values in the attribute value group, comprises:

determining the plurality of pieces of to-be-processed log data having the attribute values in the attribute value group; and respectively accumulating the indicator values of the preset indicators indicated by the plurality of pieces of to-be-processed log data having the attribute values in the attribute value group, to obtain the indicator statistic values of the preset indicators of the logs having the attribute values in the attribute value group.

15. The medium according to claim 12, the operations further comprising:

determining a plurality of attribute subgroups from the plurality of attributes;

for each attribute in each attribute subgroup, determining a plurality of attribute values of the attribute from the log data aggregation table;

determining, based on the plurality of attribute values of the attribute in the attribute subgroup, a plurality of attribute value subgroups of the attribute subgroup;

for each attribute value subgroup of the attribute value subgroups, determining, according to the log data aggregation table, an indicator statistic value of a preset indicator corresponding to the attribute value subgroup; and generating, based on indicator statistic values of preset indicators respectively corresponding to the plurality of attribute value subgroups, a log data aggregation subtable corresponding to the attribute subgroup.

16. The method according to claim 1, wherein the plurality of attributes further comprise a service type corresponding to a log and an information service response result.

17. The method according to claim 1, wherein the preset indicators comprise at least one of a number of user access logs, a delay corresponding to a user access log.

* * * * *